US010509130B2

(12) United States Patent
Snyder et al.

(10) Patent No.: US 10,509,130 B2
(45) Date of Patent: Dec. 17, 2019

(54) POSITIONING, NAVIGATION, AND TIMING DEVICE INTERFERENCE AND SPOOFING DETECTOR WITH TIMING MITIGATION

(71) Applicant: The MITRE Corporation, McLean, VA (US)

(72) Inventors: Arthur L. Snyder, Spotsylvania, VA (US); Erik T. Lundberg, Cambridge, MA (US); Keith F. McDonald, Lincoln, MA (US); Michael L. Cohen, McLean, VA (US)

(73) Assignee: The MITRE Corporation, McLean, VA (US)

( * ) Notice: Subject to any disclaimer, the term of this patent is extended or adjusted under 35 U.S.C. 154(b) by 611 days.

(21) Appl. No.: 14/248,456

(22) Filed: Apr. 9, 2014

(65) Prior Publication Data

US 2015/0293234 A1    Oct. 15, 2015

(51) Int. Cl.
*G01S 19/21*   (2010.01)
*G01S 19/13*   (2010.01)

(52) U.S. Cl.
CPC .............. *G01S 19/21* (2013.01); *G01S 19/13* (2013.01); *G01S 19/215* (2013.01)

(58) Field of Classification Search
CPC ........ G01S 19/21; G01S 19/13; G01S 19/215; G01S 19/23; G01S 5/021; G01S 5/0205;
(Continued)

(56) References Cited

U.S. PATENT DOCUMENTS 5,347,546 A * 9/1994 Abadi ..................... G01S 19/21
                                                      342/357.72
5,995,042 A * 11/1999 Durboraw, III ....... G01S 19/215
                                                      342/357.58
(Continued)

FOREIGN PATENT DOCUMENTS

EP          1 489 432 A1     12/2004
WO     WO 2004/030237 A2     4/2004
(Continued)

OTHER PUBLICATIONS

Lombardi, The Use of GPS Disciplined Oscillators as Primary Frequency Standards for Calibration and Metrology Laboratories; Sep. 2008; NCSLI Measure; vol. 3 No. 3; pp. 56-65.*
(Continued)

*Primary Examiner* — Bernarr E Gregory
*Assistant Examiner* — Daniel P Malley, Sr.
(74) *Attorney, Agent, or Firm* — Sterne, Kessler, Goldstein & Fox P.L.L.C.

(57) ABSTRACT

Disclosed herein are system, method, and computer program product embodiments for a GNSS interference and spoofing fast detection and mitigation system. A RF signal associated with a PNT device, such as a GNSS receiver, is received. The received RF signal is split into a plurality of sub-data signals. The received RF signal is re-routed by sending each of the plurality of sub-data signals to at least one of a processing module and a switching module. An anomaly associated with a second sub-data signal is detected. The anomaly is detected during a capture period of an adversarial attack on the PNT device, prior to corruption of any associated system depending on outputs from the PNT device. An output of a first sub-data signal of the plurality of sub-data signals is terminated based on the anomaly detected with the second sub-data signal.

34 Claims, 6 Drawing Sheets

(58) Field of Classification Search
CPC .... H01R 31/00; H01R 31/02; H01R 2201/02; H04K 3/80; H04K 3/82; H04K 3/825; H04K 3/86; H04K 3/90; H04K 3/92; H04K 3/224; H04K 3/65
See application file for complete search history.

(56) References Cited

U.S. PATENT DOCUMENTS

| | | | |
|---|---|---|---|
| 6,160,861 A | 12/2000 | McCullough | |
| 6,639,541 B1* | 10/2003 | Quintana | G01S 19/21 342/18 |
| 7,764,224 B1 | 7/2010 | Anderson | |
| 2003/0181192 A1* | 9/2003 | Park | H04B 1/005 455/335 |
| 2005/0107052 A1* | 5/2005 | Zangerl | G01S 19/36 455/129 |
| 2005/0193419 A1* | 9/2005 | Lindstrom | H04N 7/20 725/71 |
| 2007/0115175 A1* | 5/2007 | Velicer | G01S 3/36 342/432 |
| 2008/0062039 A1* | 3/2008 | Cohen | G01S 19/05 342/357.29 |
| 2009/0203396 A1* | 8/2009 | Zhitnitsky | G01S 19/36 455/552.1 |
| 2009/0298422 A1 | 12/2009 | Conroy et al. | |
| 2010/0061351 A1* | 3/2010 | Lee | H04W 72/082 370/338 |
| 2010/0134352 A1* | 6/2010 | Thomson | G01S 19/215 342/357.45 |
| 2010/0279734 A1* | 11/2010 | Karkinen | H01Q 3/24 455/554.2 |
| 2011/0102259 A1 | 5/2011 | Ledvina et al. | |
| 2011/0234469 A1* | 9/2011 | Shoji | H01Q 21/28 343/852 |
| 2012/0086597 A1 | 4/2012 | Sin et al. | |
| 2013/0002477 A1* | 1/2013 | Dehnie | G01S 19/215 342/357.3 |
| 2013/0157605 A1* | 6/2013 | Dickman | H04B 1/10 455/296 |
| 2014/0111249 A1* | 4/2014 | Whitehead | G06F 1/14 327/99 |
| 2015/0097721 A1* | 4/2015 | Broussalian | G01S 19/015 342/357.2 |
| 2016/0072513 A1* | 3/2016 | Dickerson | H03L 7/26 331/16 |

FOREIGN PATENT DOCUMENTS

| | | |
|---|---|---|
| WO | WO 2004/031797 A1 | 4/2004 |
| WO | WO 2005/040848 A1 | 5/2005 |
| WO | WO 2013/043851 A1 | 3/2013 |

OTHER PUBLICATIONS

Airst, M.J., "GPS Network Timing Integrity," The MITRE Corporation, Retrieved from the Internet: URL:http://www.gps.gov/governance/advisory/meetings/2012-08/airst.pdf, [retrieved] on Jul. 9, 2013], pp. 1-20 (Aug. 31, 2012).

Extended European Search Report for European Patent Appl. No. 15162844.3, dated Sep. 28, 2015, 7 pages.

Shepard, D.P. et al., "Evaluation of Smart Grid and Civilian UAV Vulnerability to GPS Spoofing Attacks," *GNSS 2012—Proc. of the 25th International Technical Meeting of the Satellite Division of the Institute of Navigation*, Institute of Navigation, Manassas, Virginia. pp. 3591-3605 (Sep. 21, 2012).

Vallés, E.L. et al., "Phase Tracking with a Cognitive Antijam Receiver System (CARS)," *The 2010 Military Communication Conference—Unclassified Program—Waveforms and Signal Processing Track*, IEEE, Piscataway, New Jersey, pp. 1701-1706 (Oct. 31, 2010).

* cited by examiner

POSITIONING, NAVIGATION, AND TIMING DEVICE INTERFERENCE AND SPOOFING DETECTOR WITH TIMING MITIGATION

BACKGROUND

Systems that require positioning, navigation, and timing in order to function with full effectiveness rely on time and frequency subsystems (TFS). Performance of these systems requiring accurate timing may suffer due to vulnerabilities in the time and frequency subsystem from which timing is derived. Time and frequency subsystems typically obtain timing from a Global Navigation Satellite System (GNSS) receiver, such as a Global Positioning System (GPS) receiver, but can also obtain timing from other radio frequency (RF) sources. Such receivers are vulnerable to anomalies in the RF signals, which are difficult for the receiver to detect.

These anomalies can be the result of natural or human-made interference (such as a spoofing attack). Natural interference includes radio frequency (RF) noise, often generated from nearby transmitters or electrical equipment. Space weather events such as solar radio bursts can also produce natural interference. Human-made interference includes jamming and spoofing. A jamming attack is the intentional transmitting of RF signals by an adversary to disrupt or over-power reception of legitimate GPS RF signals by the targeted system. A spoofing attack is a technique used by an adversary to masquerade or falsify GPS RF signals, unknown to users of the targeted system. Additionally, unintentional spoofing can be caused by a faulty or misconfigured nearby device re-radiating GPS RF signals, such as a GNSS repeater. In subsequent paragraphs, the term "anomaly" refers to all types of RF signal interference and spoofing.

A Global Navigation Satellite System (GNSS), such as the Global Positioning System (GPS), entails a number of satellites that broadcast RF signals from which positioning, navigation, and timing (PNT) can be derived by receivers. For example, GPS satellites broadcast data encoded in RF signals. There are several codes used by GPS, and they are being continually improved. Two of these codes are the P-code, which is encrypted and generally used by the military; and the C/A code, which is not encrypted and generally used by civil infrastructure. The GPS receiver uses the data encoded in the GPS signals to determine PNT. A GNSS spoofing attack involves an attempt by an adversary to deceive a GNSS receiver, such as a GPS receiver, by broadcasting a signal which is different than the legitimate signals received from the GNSS satellites. Using GPS as an example, the broadcast signals are designed to appear as normal or standard GPS signals. However, the spoofed signals are modified in such a manner as to cause the GPS receiver to produce inaccurate time or timing intervals and/or produce a position at a location determined by the attacker, as opposed to the actual universal coordinated time (UTC) time or the receiver's actual location. Thus, the goal of spoofing is to provide a GPS receiver with misleading signals and therefore deceive the receiver to use fake signals for positioning and timing calculations, which will not be accurate.

The high reliance on GPS within civil infrastructure is an inherent security vulnerability. Individuals, groups, or nations interested in causing harm can target the GPS-based timing subsystem to attack a GPS reliant system, thereby potentially disrupting or disabling swaths of infrastructure including national critical infrastructure such as the financial and power industries, as well as communications and information technology networks, especially cellular communication systems. In particular, the concern is over GPS spoofing, an insidious form of intentional attack whereby a spoofer transmits counterfeit GPS signals to an unsuspecting (and unprotected) receiver. Spoofing is more malignant than jamming, because current civil receivers trust all GPS signals to be true, and therefore cannot warn the user, much less take evasive action, when confronted with counterfeit signals.

While the GPS P-code is encrypted and thus, is difficult to spoof, the civilian GPS signal, the C/A code (and other non-encrypted GNSS codes), are relatively easy to spoof because the signal structure, the spread spectrum codes, and modulation methods are open to the public. Insecure civil GPS technology has recently been utilized by critical systems, such as communications systems, banking and finance institutions, and the power grid. Consequently, these systems could be severely compromised when subjected to a spoofing attack resulting in positioning or timing anomalies that may further cause critical system degradation or disruption.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

Embodiments are described, by way of example only, with reference to the accompanying drawings. Further, the accompanying drawings, which are incorporated herein and form part of the specification, illustrate the embodiments of the present disclosure and, together with the description, further serve to explain the principles of the disclosure and to enable a person skilled in the relevant art(s) to make and use embodiments thereof.

DETAILED DESCRIPTION

Provided herein are system, method and/or computer program product embodiments, and/or combinations and sub-combinations thereof, for a fast detection and mitigation of GNSS signal anomalies, including spoofing or jamming attacks on systems, such as but not limited to, systems requiring PNT based on GNSS.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
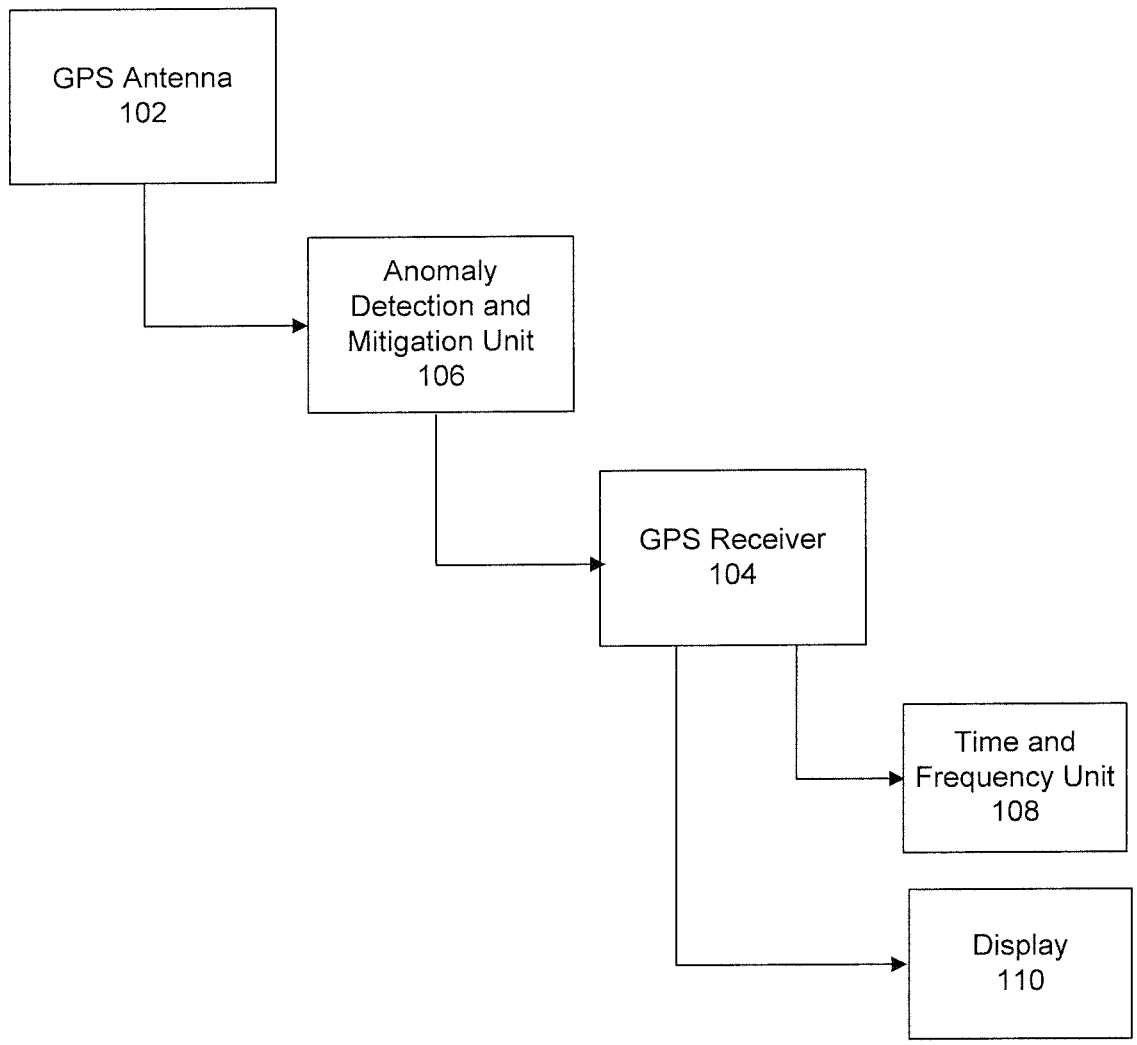
FIG. 1 is a block diagram of an anomaly detection and mitigation system, according to an example embodiment.

FIG. 1 is a block diagram illustrating anomaly detection and mitigation system 100, which provides fast protection of time and frequency based systems, according to an embodiment. Anomaly detection and mitigation system includes a GPS antenna 102, a GPS receiver 104, an anomaly detection and mitigation unit 106, a time and frequency (TFS) unit 108, and a display 110. Although FIG. 1 illustrates GPS receiver 104 and TFS unit 108 separately, embodiments are not limited to this implementation. For example, GPS receiver 104 can be embedded in the TFS unit 108. Such an implementation will be illustrated and discussed with respect to FIG. 2 below.

In conventional systems, GPS receiver 104 would be configured to measure the relative time delay of signals from a plurality of GPS antennas 102. The relative time delay of signals issued by GPS receiver 104 to determine the absolute spatial coordinates and a time coordinate. GPS receiver 104 can be combined with an oscillator (e.g., quartz or rubidium oscillator) to form a GPS disciplined oscillator (GPSDO). In such a scenario, the output frequency of the oscillator is controlled to match the timing signals derived by GPS receiver 104 from the RF signals received from GPS antenna 102. A GPSDO disciplines or continuously steers the oscillator by locking the output frequency of the oscillator to the timing signal from GPS receiver 104 utilizing a tracking loop. In an embodiment, "disciplining" of the oscillator is performed in a manner similar to a phase-locked loop (PLL), where a control system generates an output signal with a phase that is related to the phase of an input signal. In a GPSDO, disciplining can be performed by a microcontroller that enables a direct comparison between the timing signals from GPS receiver 104 and the oscillator output. Additionally, the microcontroller of a GPSDO is configured to account for factors such as the phase and frequency changes of the oscillator output. When the timing signals from GPS receiver 104 become unavailable, the GPSDO goes into a state of holdover, and the oscillator is configured to maintain the timing for the system consistent with the characteristics of the oscillator such as drift rate, jitter, phase noise, and temperature dependence. The holdover mechanism will be discussed in further detail below.

GPS receiver 104 can be compromised by a targeted attack, such as a spoofing or jamming attack. A spoofing attack, for example, can attempt to modify the associated time coordinates or spatial coordinates of a GPS system, which can result in inaccurate time and spatial information from GPS receiver 104. Alternatively, a jamming attack can attempt to interfere with the operation of GPS-based system by saturating GPS receiver 104 with noise which may result in the legitimate, accurate signals received from GPS antennas 102 being blocked.

Embodiments are aimed at providing techniques for detecting and mitigating a spoofing attack prior to the spoofing attack taking over or compromising a system. In other words, techniques are aimed at preventing a spoofing attack from corrupting a TFS's local holdover oscillator frequency. In an embodiment, anomaly detection system 100 operates as follows. Anomaly detection and mitigation unit 106 receives an RF signal from GPS antenna 102. While embodiments herein are described using a GPS antenna and GPS receiver, persons of ordinary skill in the art will appreciate that any Global Navigation Satellite System (GNSS) may be utilized.

GPS antenna 102 outputs RF data signals which are transmitted to anomaly detection and mitigation unit 106, according to an embodiment. Anomaly detection and mitigation unit 106 receives the RF data signals from GPS antenna 102 and splits the signal into a plurality of sub-data signals, according to an embodiment. For example, anomaly detection and mitigation unit 106 can split a RF signal received from GPS antenna 102 into three RF band sub-data signals. Anomaly detection and mitigation unit 106 can be configured to split the received RF signal from GPS antenna 102 into as many sub-data signals as needed, while maintaining the signal integrity of the original RF signal from GPS antenna 102. Hence, while embodiments discussed herein describe anomaly detection and mitigation unit 106 splitting the original, signal received from GPS antenna 102 into three sub-data signals, a person of ordinary skill in the art would clearly recognize that the RF signal can be split into more or fewer sub-data signals depending on the goals or requirements of anomaly detection and mitigation unit 106.

According to an embodiment, anomaly detection and mitigation unit 106 is configured to route the plurality of sub-data signals. In conventional systems, the GPS-derived timing signals from GPS receiver 104 are sent directly to a TFS or to sector equipment which depend on the GPS-derived timing signals for timing and synchronization purposes. Since the sector equipment receives the GPS-derived timing signals directly from a GPS receiver or through a TFS, it is important to detect attacks prior to the attack impacting the GPS receiver 104. Often a GPS spoofer is able to compromise the accuracy of the timing signals and equipment, prior to anti-spoofing mechanisms detecting the attack. Hence, in conventional systems, anti-spoofing techniques are reactionary. Most frequently there are no specific anti-spoofing techniques implemented in either or both of the GPS receiver and TFS. Specifically for spoofing, the anti-spoofing techniques are often configured to detect a spoofing attack after the spoofer has taken control of, or corrupted, a system.

Embodiments prevent a GPS spoofer from corrupting a system by providing fast detection mechanisms via anomaly detection and mitigation unit 106. Anomaly detection and mitigation unit 106 routes the plurality of sub-data signals to at least one of possibly several processing modules and a switching module. For example, when anomaly detection and mitigation unit 106 splits an RF signal from GPS antenna 102 into three RF sub-data signals, a first sub-data signal can be sent to an anomaly detector processing module (not illustrated), a second sub-data signal can be sent to a RF switching module (not illustrated), and a third sub-data signal can be sent to a conventional spoofing and jamming detection module (not illustrated). The second sub-data signal that is routed to a switching module can be outputted or relayed to a TFS which includes a GPS receiver and performs final processing of the signal prior to providing timing, positioning and synchronization information to one or more sector devices, according to an embodiment. The third sub-data signal that is re-routed to a conventional spoofing and jamming detection module can be used to detect a spoofing or jamming attack in a conventional manner. That is, the conventional spoofing and jamming detection module can utilize the third sub-data signal to perform reactionary detection of a spoofed or jammed transmission signal from the GPS receiver after an attack is underway and active.

According to an embodiment, the first sub-data signal that is routed to an anomaly detector processing module can be utilized to perform detection of a spoofing or jamming attack prior to a complete compromise of a system by the attack. In an embodiment, a power level associated with the first sub-data signal can be monitored to determine if there is a power increase associated with the first sub-data signal. A technique that is utilized by a GPS spoofer during an attack is the overpowering of the original or accurate signal at the GPS receiver 104. That is, the GPS spoofer broadcasts a spoofing signal that is significantly higher in power than the legitimate, accurate signal. One common form of GPS spoofing, commonly termed a carry-off attack, begins by broadcasting signals synchronized with the genuine signals observed by the target GPS receiver. The power of the counterfeit signals is then gradually increased and the GPS receiver starts to track the counterfeit signals rather than the genuine signals. In this way, the GPS spoofer can overpower the legitimate RF signal and force the GPS receiver to track the signal that is broadcast from the spoofer. The GPS receiver then outputs inaccurate PNT. A second technique utilized by a spoofer is a combined jamming and spoofing attack wherein a high power jamming signal is applied for a period of time followed by a spoofing signal. During the jamming period of the combined attack the GPS receiver outputs no PNT and during the spoofing period the GPS receiver output inaccurate PNT. In the second spoofing technique the jamming period serves a similar purpose as the capture period in the first spoofing technique. Hereafter, the term "capture period" will refer to either the capture period of the first spoofing technique, or the jamming period of the second technique.

The first sub-data signal is utilized to combat such adversarial attacks by monitoring the power levels of a GPS signal during a capture period but prior to a walkoff period of an adversarial attack on the navigation device. Monitoring of the power levels is performed continuously in order to determine discrepancies between an accurate signal power level and a combined authentic and counterfeit signal power level therefore detecting interference (including jamming and spoofing) prior to the spoofer or jammer corrupting the system. In order to mask spoofing and jamming activity, a GPS spoofer, which relies on overpowering the authentic GPS signal, may gradually increase the signal power of the counterfeit signal so it will not be detected by existing GPS receivers, TFS's, and reactionary spoofing detection techniques. The period where there is a gradual increase in a GPS spoofer power is known as the capture period. During the capture period, the GPS spoofer does not have control over the system and the GPS receiver 104 continues to report accurate timing signals. During the capture period, the intent of a GPS spoofer is to deceive the GPS receiver in such a way as to avoid any signal integrity monitoring capability of the GPS receiver. The spoofer does not have control over the GPS receiver until the walkoff period is reached, which is when the GPS receiver is effectively spoofed. Since a GPS spoofer is configured to broadcast RF signals which resemble a set of legitimate, accurate GPS RF signals, but the signals are actually incorrect for position or time, the broadcast counterfeit signals may cause the receiver to determine its position to be somewhere other than the accurate position, or to be located at an accurate position but at an inaccurate time. During the carry-off period, a GPS spoofer begins by broadcasting or re-broadcasting counterfeit signals that are received by GPS receiver 104. As discussed above, subsequently, the power of the counterfeit signal is slowly increased and the GPS receiver is tricked and drawn away from the accurate signal to track the counterfeit signal. It should be noted that the authentic GPS signals are still present so the total RF power seen by GPS receiver 104 will increase during a spoofing attack. The capture period for a GPS spoofing attack can generally last between 1 minute and 10 minutes, though it could be longer, depending on the speed of the attack and sophistication of the spoofer. Once the capture period is complete, the legitimate, accurate signal for GPS receiver 104 has been effectively masked or denied and the spoofing attack enters an attack period, where the position and timing outputs GPS receiver 104 are controlled by the spoofer. The GPS receiver 104 now outputs erroneous position and time information to the TFS or sector equipment.

Anomaly detection and mitigation unit 106 is configured to monitor a power level associated with a first sub-data signal continuously to perform fast detection of the interference during the capture period of a spoofing attack, according to an embodiment. The total in-band power measurement of the first sub-data signal is a measure of the combined authentic in-band GPS signal power, in-band unintentional interference power and in-band intentional interference (including jamming and spoofing) at the GPS antenna 102. A total in-band power measurement of the first sub-data signal can be determined based on various power measurement techniques, according to an embodiment. The total in-band power of the first sub-data signal can be measured by calculating and integrating a power spectral density of the first sub-data signal, or by specialized RF electronics, among other techniques. The power levels of the first sub-data signal are monitored continuously, according to an embodiment. The power measurement value can then be compared to a pre-determined baseline power measurement or level. If the power measured on the first sub-data signal is different than the predetermined baseline power level, then this is an indication that a GPS spoofing attack's capture period may be underway, or that other interference (such as jamming) is occurring. In response to such a determination, anomaly detection and mitigation unit 106 is configured to send a signal to a switch control (not illustrated), which terminates the output of the second sub-data signal to a timing and frequency system, prior to the spoofer entering an attack period.

In an embodiment, anomaly detection and mitigation unit 106 is configured to switch the RF output off going to the GPS receiver. Removing the RF to the GPS receiver initiates a local holdover oscillator in the TFS which is configured to provide the time and frequency system with accurate frequency as a substitute for the timing information derived from the second sub-data GPS RF signals. The frequency and timing provided by the holdover oscillator will be accurate based on characteristics of the holdover oscillator and the specific techniques implemented within the TFS, and maintained for a period determined by the needs of the sector equipment. By terminating the GPS RF signal output of the second sub-data signal from the anomaly detection and mitigation unit 106, the GPS receiver 104 ceases to provide PNT information to the TFS unit 108. With the loss of this information, the time and frequency unit 108 initiates using its internal local holdover oscillator for the source of frequency for timing. Prior to termination of the output of the second sub-data signal, the TFS disciplined the local holdover oscillator based on the timing data provided by the GPS receiver 104. An initiation of a holdover oscillator enables the disciplined output of the oscillator to be used to control phase and frequency variations, and as the basis for timing outputs from the TFS. This operation effectively enables the normal operating conditions to be maintained for TFS unit 108. The quality of the TFS frequency and timing output will degrade proportional to the length of operation after initiation as determined by the holdover oscillator characteristics and TFS implementation. The TFS, based on the local holdover oscillator, remains initiated and outputting valid timing information until the timing output quality degrades below system specification. A high stability holdover oscillator can maintain adequate timing quality until the spoofing or jamming is eliminated.

Once anomaly detection and mitigation unit 106 initiates the transition to the local holdover oscillator in the TFS, anomaly detection and mitigation unit 106 is configured to generate an alert or message to a network operator, via display 110, to indicate that a spoofing or jamming attack is being attempted on the GPS receiver. In this way, a network operator is provided real-time information regarding attempted attacks detected by anomaly detection and mitigation unit 106 and is immediately alerted to such an attempted attack. The operator can then take action as needed to assess the quality of the PNT over time if the attack persists. A network operator knowing that an attack is being attempted may geo-locate the spoofer or jamming device. Since the spoofer or jamming device is unaware that the attack has been detected early, the spoofer or jammer will continue to attempt to spoof or jam the signal by increasing the signal power. Anomaly detection and mitigation unit 106 is configured to continue to monitor the spoofer or jammer's signal via the first sub-data signal, according to an embodiment, and to continue reporting whether the attack continues or terminates. Coupled with the knowledge of the position of GPS receiver 104 prior to the start of the attack, this information can be used with reports from other anomaly detection and mitigation units installed at other locations to geo-locate the spoofing or jamming device attempting the attack.

Figure 2:
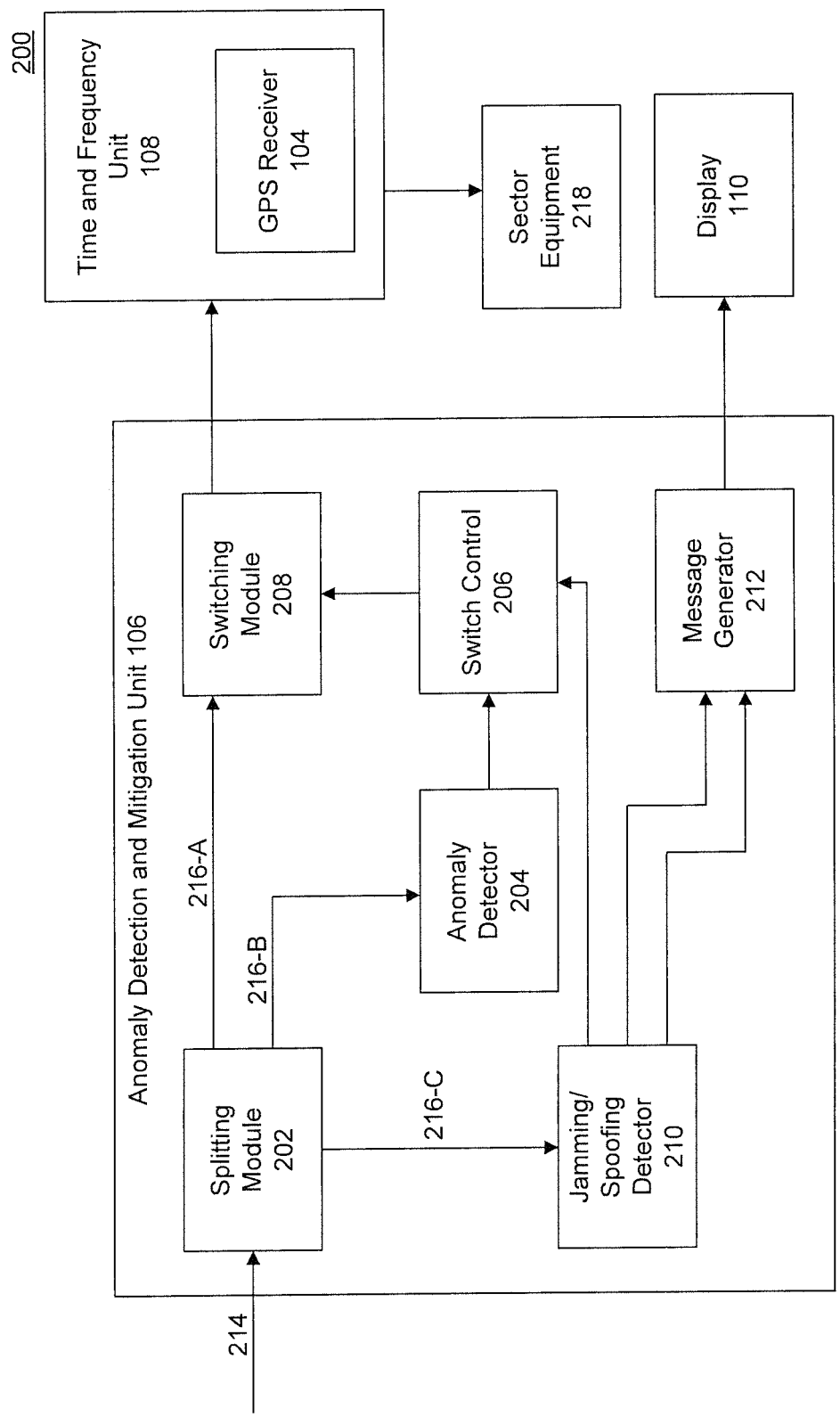
FIG. 2 is a block diagram of an anomaly detection and mitigation unit, according to an example embodiment.

FIG. 2 is a block diagram of an anomaly detection and mitigation unit, according to an example embodiment. Anomaly detection and mitigation unit 106 includes a splitting module 202, an anomaly detector 204, a switch control 206, a switching module 208, a jamming/spoofing detector 210, and a message generator 212. Anomaly detection and mitigation unit 106 is communicatively coupled to TFS unit 108 and display 110, as discussed above in FIG. 1. TFS unit 108 includes GPS receiver 104. Additionally, TFS unit 108 is communicatively coupled to sector equipment 218. One example of sector equipment 218 is a phasor measurement unit (PMU), also known as a synchrophasor. A PMU is a device that measures electromagnetic waves on an electric grid, utilizing a time source for synchronization. The time source utilized is a GPS receiver and TFS, as described above, because a GPS receiver can provide the precise timing requirements which are necessary for PMU measurement of voltage and current on a power grid to determine the health of the system, for example. Sector equipment 218 can be any GPS-based or reliant devices that depend on a GPS or GNSS receiver in order to perform timing and synchronization operations.

Anomaly detection and mitigation unit 106 and each of splitting module 202, anomaly detector 204, switch control 206, switching module 208, jamming/spoofing detector 210, and message generator 212 can be software, firmware, or hardware or any combination thereof in a computing device. Anomaly detection and mitigation unit 106 can be implemented on or implemented with one or more client computing devices. A client computing device can be any type of computing device having one or more processors and memory. For example, a client computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A client computing device may include a communication port or input/output (I/O) device for communicating over wired or wireless communication link(s). A further example of a computing device is described with respect to FIG. 6 below.

According to an embodiment, splitting module 202 is configured to receive an authentic or legitimate RF signal 214. Legitimate RF signal 214 can be received from a GNSS antenna, such as a GPS antenna, according to an embodiment. Upon reception of a RF signal from a GNSS antenna, such as a GPS antenna, splitting module 202 splits the signal into a plurality of sub-data signals, according to an embodiment. In an embodiment, the received signal is split into three sub-data signals 216. As splitting module 202 splits the received signal into a plurality of sub-data signals, there can be an associated reduction in the original signal level, where the level of reduction depends on the quantity of sub-data signals generated. Accordingly, in an embodiment, splitting module 202 can be configured to split the received data signal, such that each of the plurality of sub-data signals maintains the signal strength needed by the respective equipment or modules to which it goes.

According to an embodiment, splitting module 202 is configured to route the plurality of sub-data signals 216 to respective processing or switching modules. For example, FIG. 2 illustrates that a first sub-data signal 216-A is routed to switching module 208, a second sub-data signal 216-B is routed to anomaly detector 204, and a third sub-data signal 216-C is routed to a jamming/spoofing detector 210. Before discussing the processing of second sub-data signal 216-B by anomaly detector 204, the processing of first sub-data signal 216-A by switching module 208 and third sub-data 216-C by jamming/spoofing detector 210 is briefly discussed. Switching module 208 acts as a conduit for sending first sub-data signal 216-A to TFS unit 108 which includes GPS receiver 104. Hence, legitimate RF signal 214 can be sent to TFS unit 108 by switching module 208 outputting first sub-data signal 216-A. During normal operation of system 200 (i.e. no spoofing attack), the first sub-data signal 216-A functions as the input signal which TFS unit 108 and GPS receiver 104 utilize for timing, positioning and synchronization purposes.

Jamming/spoofing detector 210 is configured to perform reactionary anti-spoofing or anti jamming mechanisms, in an embodiment. The reactionary anti-spoofing or anti jamming techniques are capable of detecting interference with a GPS receiver based on a position reported by a GPS receiver, a timing measurement reported by a GPS receiver, and a signal quality measurement associated with a GPS receiver. Jamming/spoofing detector 210 monitors the third sub-data signal 216 to detect a spoofing or jamming attack after TFS unit 108 and/or sector equipment 218 could have been compromised by the attack if the anomaly detector 204 had not terminated the outputs from the switching module 208. When a reactionary anti-spoofing or anti-jamming technique is executed, jamming/spoofing detector 210 is configured to generate an alert or message to a network operator at display 110, via message generator 212, to indicate that there is a discrepancy with the RF signal from the GPS antenna.

Anomaly detector 204 is configured to perform fast detection of a GPS spoofing or jamming attack. Anomaly detector 204 monitors a power level associated with second sub-data signal 216-B during a capture period of a spoofing attack, according to an embodiment. The design of anomaly detector 204 enables it to immediately enable the switch control to cutoff the first sub-data signal 216-A to the GPS receiver when jamming/spoofing is detected. The monitoring of the power level of first sub-data signal 216 is performed continuously and detects spoofing during the capture period by determining whether there is an increase in power of the second sub-data signal 216-B. During a spoofing or jamming attack, a GPS spoofer or jammer will attempt to overpower the authentic/legitimate GPS RF signal 214 by broadcasting counterfeit RF signals which resemble legitimate signal 214 or rebroadcasting instances of legitimate RF signal 214 which were previously captured. A spoofer may gradually increase the power level of the counterfeit RF signal and aims to have the GPS receiver eventually steer off of the legitimate RF signal 214 and latch onto the counterfeit signal. The time during which there is a gradual increasing of the power level of the counterfeit RF signal and prior to the GPS receiver tracking the counterfeit signal is known as the capture period. This occurs right before the walkoff period during which the RF signal is spoofed and the GPS receiver is deceived into following the spoofed RF signal versus the legitimate signal. Anomaly detector 204 continually monitors the second sub-data signal 216-B and during a capture period detects any increases in power of the second sub-data signal 216-B. If the power level of the second sub-data signal 216-B increases above a pre-determined baseline power measurement or threshold, the increase serves as an indication that a spoofer or jammer is attempting to compromise system 200. In another embodiment, anomaly detector 204 is configured to detect anomalies immediately. This occurs when an adversarial attack is a jamming attack, for example. In such a scenario, anomaly detector 204 generates and sends a message to switch control 206. Switch control 206 is configured to switch off the output of first sub-data signal 216-A, which is output by switching module 208.

TFS unit 108 includes a local holdover oscillator (not illustrated) which can output disciplined frequency signals as a substitute for the timing information determined from the first sub-data signal 216-A. TFS unit 108 provides a holdover capability, via the local holdover oscillator, outputting timing or data signals that are based on the disciplined frequency of the holdover oscillator. The frequency of the holdover oscillator was disciplined from timing information derived by the GPS receiver 104 from the first sub-data (RF) signal 216-A. Switching module 208 is configured to block first sub-data signal 216-A so that the TFS unit 108 will utilize the local holder oscillator for time and frequency until the legitimate RF signal 214 (and split sub-data signal 216-A) is restored by eliminating the GPS spoofing or jamming attack threat. In this way, anomaly detection and mitigation unit 106 can provide fast detection of a GPS spoofing or jamming attack and prevent the GPS spoofer or jammer from corrupting the timing and positioning information received by TFS 108 and GPS receiver 104, and subsequently sector equipment 218. According to another embodiment, while the local holdover oscillator of TFS unit 108 is engaged, jamming/spoofing detector 210 can provide information to message generator 212 to send a message to network operators and geodetic information systems to enable geo-location of the spoofing or jamming device In this way, jamming/spoofing detector 210 and message generator 212 provide a network operator with information regarding the spoofing or jamming attack to enable geo-location of the attacker.

Figure 3:
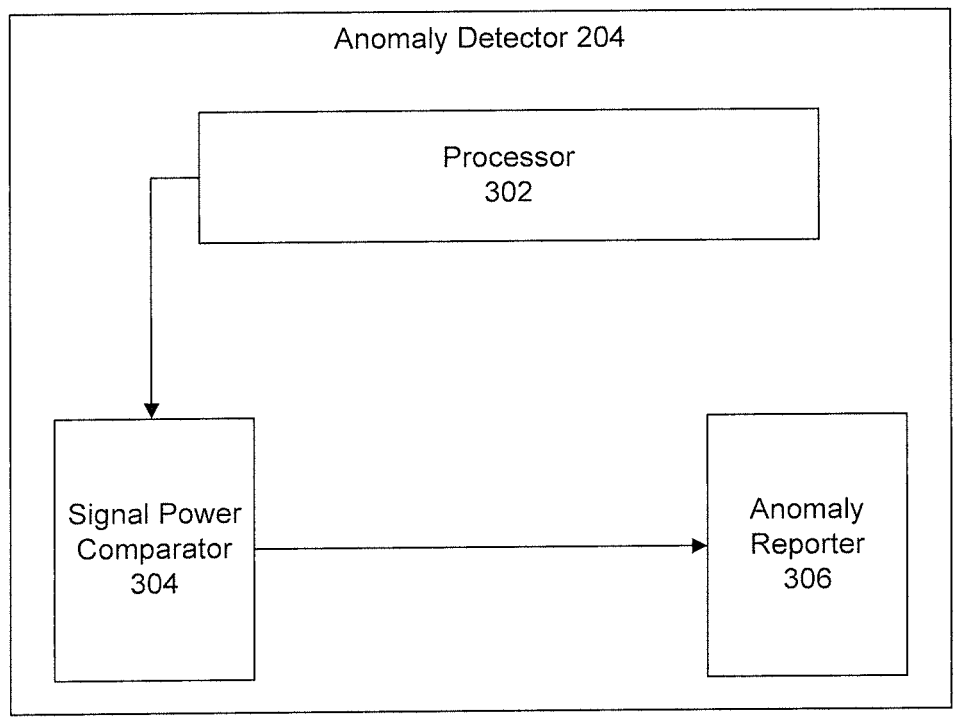
FIG. 3 is a block diagram of an anomaly detector, according to an example embodiment.

FIG. 3 illustrates anomaly detector 204. Anomaly detector 204 includes a processor 302, a signal power comparator 304, and anomaly reporter 306.

As discussed above, anomaly detector 204 can be software, firmware, or hardware or any combination thereof in a computing device. In one example, processor 302 can be a microprocessor, a digital signal processor, a state machine, or the like, which processes data received from a GNSS antenna, such as a GPS antenna, while under control of underlying firmware, software, or both. In another example, processor 302 can be part of a computer system, as would be apparent to a skilled artisan. Alternatively or additionally, additional hardware components can be used to perform one or more of the operations discussed below.

Anomaly detector 204 is configured to receive a second sub-data signal. The second sub-data signal is received after an RF signal is split into a plurality of sub-data signals and is re-routed. The second sub-data signal is one of the signals of the plurality of sub-data signals, according to an embodiment. Signal power comparator 304 is configured to continuously monitor a power level associated with the second sub-data signal, according to an embodiment. A total in-band power measurement of the second sub-data signal is continuously computed in an embodiment. A total in-band power measurement of the second sub-data signal can be determined based on various power measurement techniques, such as calculating and integrating a power spectral density of the second sub-data signal. In another embodiment, signal power comparator 304 can record characteristics of the second sub-data signal during normal operating conditions.

According to an embodiment, signal power comparator 304 can use the total in-band power measurement value for the second sub-data signal and compare the value to a pre-determined baseline power measurement. If the power level of the second sub-data signal is different than the predetermined baseline power measurement by a pre-determined power threshold, then this increase is an indication that a GPS spoofing or jamming attack is underway. In response to such a determination, anomaly reporter 306 is configured to send a signal to the switch control 206, which then switches the switching module 208 to block first sub-data (RF) signal 216-A from the time and frequency system, forcing the TFS to use a local holdover oscillator, as previously discussed.

Overview of the Method

Figure 4:
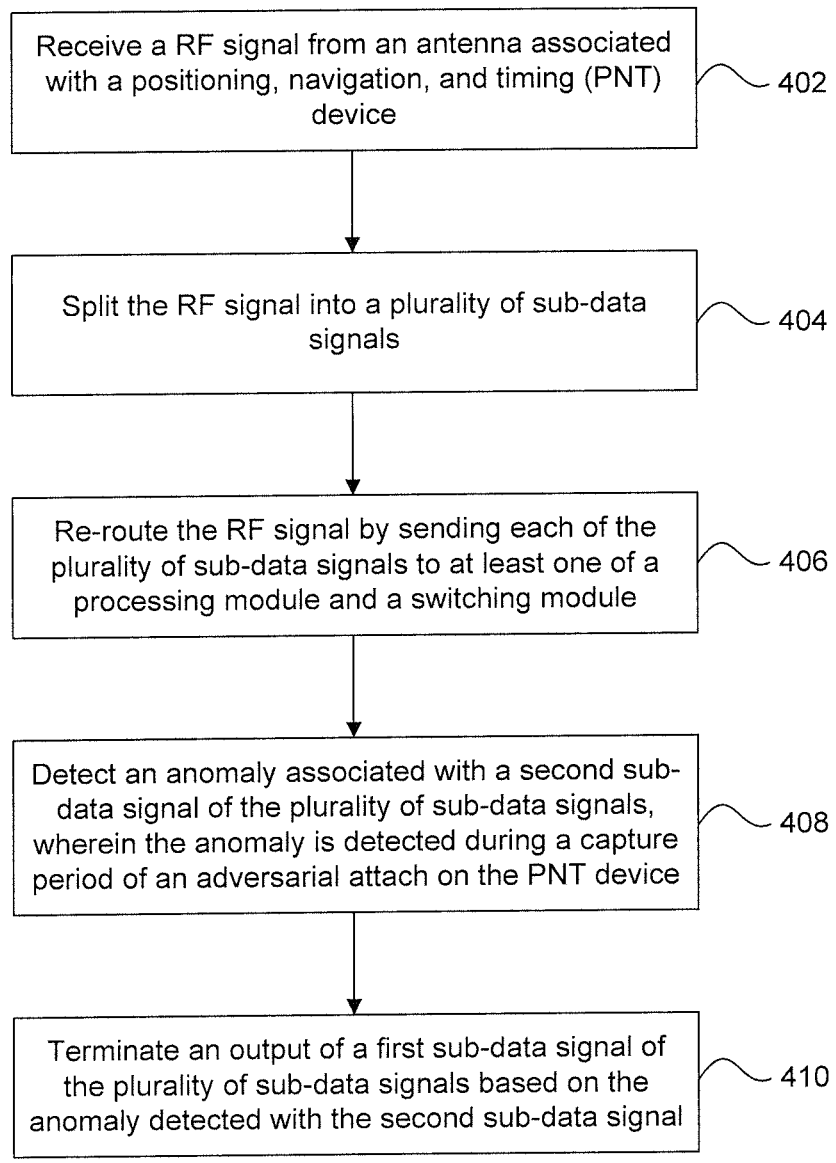
FIG. 4 is a flowchart illustrating a process for a fast anomaly detection and mitigation system, according to an example embodiment.

FIG. 4 is a flowchart illustrating a process for a fast anomaly detection and mitigation system 200, according to an example embodiment.

At step 402, an RF signal associated with a GNSS antenna, such as a GPS antenna, is received. For example, step 402 may be performed by anomaly detection and mitigation unit 106 of system 200. A RF signal from a GPS antenna may be received. As discussed above, time and frequency systems are vulnerable to attacks from adversaries who may attempt to modify or spoof the signal. A modification or spoofing of the RF signal could result in a compromised system that does not operate as intended.

At step 404, the received RF signal is split into a plurality of sub-data signals. For example, step 404 may be performed by splitting module 202 of system 200. The received RF signal can be split into three sub-data signals, where the integrity of the received RF signal is maintained. Thus, the three sub-data signals are essentially replicates of the received RF signal, though there may be a reduction in power level. The splitting module 202 maintains the power level of the sub-data signals as needed by the receiving components.

At step 406, the received RF signal is routed by sending each of the plurality of sub-data signals to respective processing or switching modules. For example step 406 may be performed by splitting module 202 of system 200. In the example above, where the received RF signal is split into three sub-data signals, a the second sub-data signal can be sent to an anomaly detector processor, a third sub-data signal can be sent to a reactionary anti-spoofing or anti jamming processor, and a first sub-data signal can be sent to a switching module which effectively relays the RF signal to a time and frequency system.

At step 408, an anomaly associated with the second sub-data signal is detected. For example, step 408 may be performed by anomaly detection and mitigation unit 106 of system 200. A power level associated with the second sub-data signal can be monitored, according to an embodiment. If the power level exceeds a pre-determined power threshold, then this is an indication of a spoofing or jamming attempt. In an embodiment, a power level of the second sub-data signal can be monitored for a spoofing or jamming attack. The capture period is prior to the spoofer completing a successful adversarial attack (i.e. the walkoff period). The anomaly detector uses the switching module to cutoff RF signals to the TFS for RF anomalies, including interference, jamming, and spoofing.

At step 410, an output of a first sub-data signal is terminated. For example, step 410 may be performed by anomaly detection and mitigation unit 106 of system 200. Once a spoofing or jamming attack is suspected at step 408, the output of a first sub-data signal to a time and frequency system is ended. The first sub-data signal provides the RF signals by which the GPS receiver derives timing to enable the time and frequency system to perform synchronization operations. When the first sub-data signal is terminated, a local holdover oscillator is utilized by the TFS to supply frequency to the time and frequency system. The local holdover oscillator provides a substitute signal based on being previously disciplined by the TFS based on the RF received in step 402 by the GPS receiver.

Figure 5:
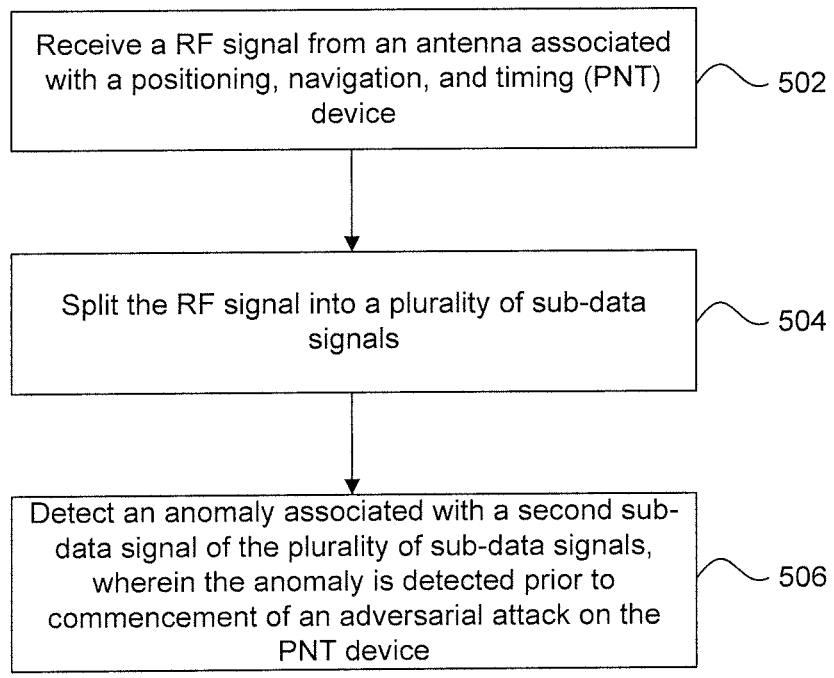
FIG. 5 is a flowchart illustrating a process for a fast anomaly detection system, according to an example embodiment.

FIG. 5 is a flowchart illustrating a process for a fast anomaly detection system, according to an example embodiment.

At step 502, an RF signal is received from a GNSS antenna, such as a GPS antenna. The processing of step 502 is similar to the processing of step 402 of FIG. 4 described above.

At step 504, the RF signal is split into a plurality of sub-data signals. The processing of step 504 is similar to the processing of step 404 of FIG. 4 described above.

At step 506, an anomaly associated with the second sub-data signal is detected. The processing of step 506 is similar to the processing of step 408 of FIG. 4 described above. As discussed above, the anomaly associated with the first sub-data signal is detected a spoofing or jamming attack.

Example Computer System

Various embodiments can be implemented, for example, using one or more well-known computer systems, such as computer systems 100 and 200 shown in FIG. 1 and FIG. 2. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606. Computer system 600 may be implemented through the use of a microcontroller, field programmable gate array (FPGA) or other computational system.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication path 626 may enable communicating a warning that a spoofing/jamming attack has been detected to a remote user, a user's remote management, and/or at the user's discretion to entities within the U.S. Government. As another example, communication interface 624 may allow computer system 600 to communicate with remote devices 628 over communications path 626, which may be wired, and/or wireless, and which may include any combination of LANs, WANs, the Internet, etc. Control logic and/or data may be transmitted to and from computer system 500 via communication path 626 which should be secured by standard Cybersecurity means.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Figure 6:
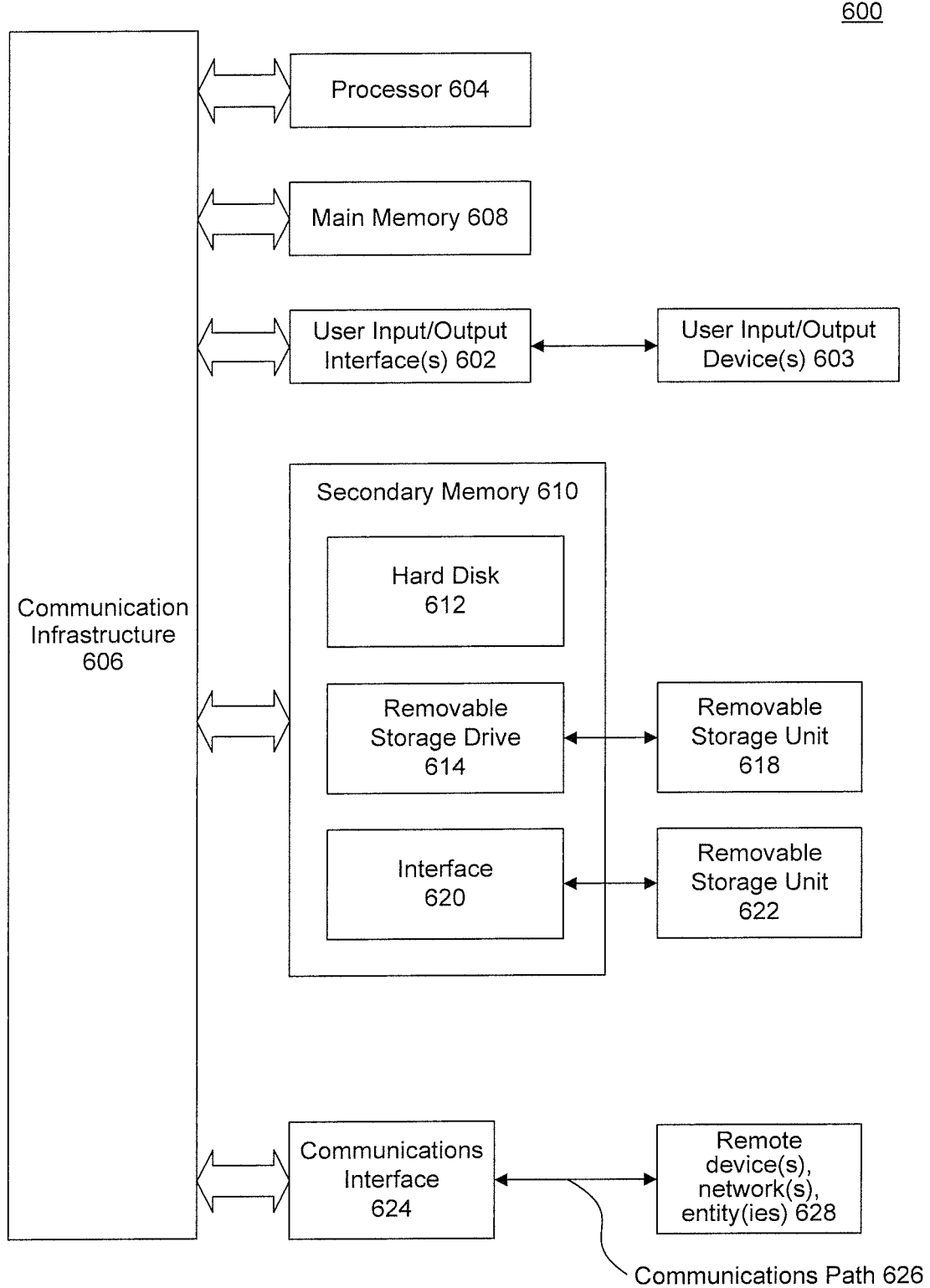
FIG. 6 is an example computer system useful for implementing various embodiments, to include, for example, communicating the detected anomaly (interference or spoofing) to remote entities or networks.

Based on the teachings contained in this disclosure, it will be apparent to persons skilled in the relevant art(s) how to make and use the invention using data processing devices, computer systems and/or computer architectures other than that shown in FIG. 6. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method comprising:
   receiving a radio frequency (RF) signal from an antenna associated with a positioning, navigation and timing (PNT) device;
   splitting the RF signal into a plurality of RF data signals, comprising at least a first RF data signal and a second RF data signal, wherein the plurality of RF data signals are replicates of the RF signal;
   sending the first RF data signal to a first processing device and the second RF data signal to a second processing device, wherein the first and second processing devices are configured to assist in detection and mitigation of an adversarial attack and wherein the first processing device is configured to output the first data signal to a time and frequency subsystem;
   detecting, by the second processing device, an anomaly associated with the second RF data signal;
   transmitting, by the second processing device to a switch-control logic mechanism, a signal in response to detecting the anomaly associated with the second RF data signal;
   transmitting, by the switch-control logic mechanism to the first processing device, a cutoff signal responsive to receiving the signal; and
   terminating, by the first processing device, the output of the first RF data signal to the time and frequency subsystem based on the cutoff signal.

2. The method of claim 1, wherein the detecting occurs during or prior to a walkoff period of the adversarial attack.

3. The method of claim 2, wherein the adversarial attack is a spoofing attack.

4. The method of claim 1, wherein the terminating is performed upon detection of the anomaly and prior to a walkoff period of the adversarial attack.

5. The method of claim 4, wherein the adversarial attack is a jamming attack.

6. The method of claim 1, further comprising:
triggering a local holdover oscillation after the output of the first RF data signal is terminated, wherein the triggering results in outputting a substitute signal, for a duration at least until the adversarial attack is terminated.

7. The method of claim 1, wherein the detecting comprises:
monitoring a power level associated with the RF signal, by processing the second RF data signal;
detecting an increase in the power level; and
identifying an error with the second RF data signal based on the increase in the power level exceeding a pre-determined power threshold.

8. The method of claim 1, wherein the terminating comprises:
initiating the switch-control logic mechanism; and
sending an alert to the second processing device processing the second RF data signal,
wherein the sector device comprises a phase measurement unit (PMU), a synchrophasor apparatus, an electric grid, or a GPS-reliant device.

9. The method of claim 1, further comprising:
sending a third RF data signal to a third processing device configured to initiate reactionary anti-spoofing logic, reactionary anti jamming logic, or both, wherein the third processing device comprises a jamming or spoofing detector.

10. The method of claim 1, wherein the PNT device is a Global Navigation Satellite System (GNSS) receiver.

11. The method of claim 1, further comprising:
when the anomaly is detected, generating a threat-alert to a display, wherein the threat-alert indicates a detection of the adversarial attack on the PNT device.

12. A system comprising:
a memory; and
at least one processor coupled to the memory and configured to cause the system to:
receive a radio frequency (RF) signal from an antenna associated with a positioning, navigation and timing (PNT) device;
split the RF signal into a plurality of RF data signals, comprising at least a first RF data signal and a second RF data signal, wherein the plurality of RF data signals are replicates of the RF signal;
send the first data signal to a first processing device and the second RF data signal to a second processing device, wherein the first and second processing devices are configured to assist in detection and mitigation of an adversarial attack and wherein the first processing device is configured to output the first RF data signal to a time and frequency subsystem;
detect, by the second processing device, an anomaly associated with the second RF data signal;
transmit, by the second processing device to a switch-control logic mechanism, a signal in response to detecting the anomaly associated with the second RF data signal;
transmit, by the switch-control logic mechanism to the first processing device, a cutoff signal responsive to receiving the signal; and
terminate, by the first processing device, the output of the first RF data signal to the time and frequency subsystem based on the cutoff signal.

13. The system of claim 12, wherein the at least one processor is further configured to cause the system to detect the anomaly during or prior to a walkoff period of the adversarial attack.

14. The system of claim 13, wherein the adversarial attack is a spoofing attack.

15. The system of claim 12, wherein the at least one processor is further configured to cause the system to terminate output of the first RF data signal upon detection of the anomaly and prior to a walkoff period of the adversarial attack.

16. The system of claim 15, wherein the adversarial attack is a jamming attack.

17. The system of claim 12, wherein at least one processor is further configured to cause the system to:
trigger a local holdover oscillation after the output of the first RF data signal is terminated, wherein the triggering results in outputting a substitute signal, for a duration at least until the adversarial attack is terminated.

18. The system of claim 12, wherein at least one processor is further configured to cause the system to:
monitor a power level associated with the RF signal, by processing the second RF data signal;
detect an increase in the power level; and
identify an anomaly with the second data signal based on the increase in the power level exceeding a pre-determined power threshold.

19. The system of claim 12, wherein at least one processor is further configured to cause the system to:
initiate the switch-control logic mechanism; and
send an alert to the second processing device processing the second RF data signal,
wherein the sector device comprises a phase measurement unit (PMU), a synchrophasor apparatus, an electric grid, or a GPS-reliant device.

20. The system of claim 12, wherein the second processing device is an anomaly detector that is configured to detect anomalies, including jamming and spoofing, with the RF signal received from the antenna and wherein at least one processor is further configured to cause the system to:
send a third RF data signal to a third processing device configured to initiate reactionary anti-spoofing logic, reactionary anti jamming logic, or both, wherein the third processing device comprises a jamming or spoofing detector.

21. The system of claim 12, wherein the PNT device is a Global Navigation Satellite System (GNSS) receiver.

22. The system of claim 12, wherein the at least one processor is further configured to cause the system to, when an anomaly is detected, generate and transmit a threat-alert to a display, wherein the threat-alert indicates detection of the adversarial attack on the PNT device.

23. A tangible computer-readable device having instructions stored thereon that, when executed by at least one computing device, causes the at least one computing device to perform operations comprising:
receiving a radio frequency (RF) signal from an antenna associated with a positioning, navigation and timing (PNT) device;
splitting the RF signal into a plurality of RF data signals, comprising at least a first RF data signal and a second RF data signal, wherein the plurality of RF data signals are replicates of the RF signal;
sending the first RF data signal to a first processing device, and the second RF data signal to a second processing device, wherein the first and second processing devices are configured to process the plurality of RF data signals and assist in detection and mitigation of an adversarial attack; and detecting, by the second processing device, an anomaly associated with the second RF data signal;

transmitting, by the second processing device to a switch-control logic mechanism, a signal in response to detecting the anomaly associated with the second RF data signal;

transmitting, by the switch-control logic mechanism to the first processing device, a cutoff signal responsive to receiving the signal; and terminating, by the first processing device, the output of the first RF data signal to a time and frequency subsystem based on the cutoff signal.

24. The computer-readable device of claim 23, wherein the detecting occurs during or prior to a walkoff period of the adversarial attack.

25. The computer-readable device of claim 24, wherein the adversarial attack is a spoofing attack.

26. The computer-readable device of claim 23, wherein the terminating is performed upon detection of the anomaly and prior to a walkoff period of the adversarial attack.

27. The computer-readable device of claim 26, wherein the adversarial attack is a jamming attack.

28. The computer-readable device of claim 23, the operations further comprising:

triggering a local holdover oscillation after the output of the first RF data signal is terminated, wherein the triggering results in outputting a substitute signal for a duration at least until the adversarial attack is terminated.

29. The computer-readable device of claim 23, wherein the detecting comprises:

monitoring a power level associated with the RF signal, by processing the second RF data signal;

detecting an increase in the power level; and identifying an anomaly with the second RF data signal based on the increase in the power level exceeding a pre-determined power threshold.

30. The computer-readable device of claim 23, wherein the terminating comprises:

initiating the switch-control logic mechanism; and sending an alert to the second processing device processing the second RF data signal, wherein the sector device comprises a phase measurement unit (PMU), a synchrophasor apparatus, an electric grid, or a GPS-reliant device.

31. The computer-readable device of claim 23, wherein the second processing device comprises an anomaly detector configured to detect anomalies, including jamming and spoofing, with the RF signal received from the antenna and the operations further comprising:

sending a third RF data signal to a third processing device configured to initiate reactionary anti-spoofing logic, reactionary anti jamming logic, or both, wherein the third processing device comprises a jamming or spoofing detector.

32. The computer-readable device of claim 23, wherein the PNT device is a Global Navigation Satellite System (GNSS) receiver.

33. The computer-readable device of claim 23, the operations further comprising:

when the anomaly is detected, generating a threat-alert to transmit to a display, wherein the threat-alert indicates a detection of the adversarial attack on the PNT device.

34. A method comprising:

receiving a radio frequency (RF) signal from an antenna associated with a positioning, navigation and timing (PNT) device;

splitting the RF signal into a plurality of RF data signals, comprising at least a first RF data signal and a second RF data signal, wherein the plurality of RF data signals are replicates of the RF signal;

sending the first RF data signal to a first processing device and the second RF data signal to a second processing device, wherein the first and second processing devices are configured to process the plurality of RF data signals and assist in detection and mitigation of an adversarial attack and wherein the first processing device is configured to output the first data signal to a time and frequency subsystem;

calculating a power spectral density of the second RF data signal, wherein the calculating further comprises integration;

detecting, by the second processing device, an anomaly associated with the second RF data signal;

transmitting, by the second processing device to a switch-control logic mechanism, a signal in response to detecting the anomaly associated with the second RF data signal;

transmitting, by the switch-control logic mechanism to the first processing device, a cutoff signal responsive to receiving the signal; and terminating, by the first processing device, the output of the first RF data signal to a time and frequency subsystem based on the cutoff signal.

* * * * *